United States Patent [19]

Hayakawa et al.

[11] Patent Number: 4,697,479
[45] Date of Patent: Oct. 6, 1987

[54] ENGINE THROTTLE OPENING DEPENDENT HYDRAULIC VEHICULAR TRANSMISSION SYSTEM

[75] Inventors: Yoichi Hayakawa, Toyoake; Masao Kawai, Chiryu; Kenichi Yoshizawa, Toyota; Yoshiharu Harada, Toyota; Kagenori Fukumura, Toyota, all of Japan

[73] Assignees: Aisin-Warner Limited, Anjo; Toyota Jidosha Kabushiki Kaisha, Toyota, both of Japan

[21] Appl. No.: 819,868

[22] Filed: Jan. 15, 1986

[30] Foreign Application Priority Data

Jan. 19, 1985 [JP] Japan .................................. 60-7782
Jan. 19, 1985 [JP] Japan .................................. 60-7773

[51] Int. Cl.⁴ ........................ B60K 41/16; B60K 41/18
[52] U.S. Cl. ............................................. 74/867; 74/866; 180/247
[58] Field of Search ................ 74/740, 869, 868, 867, 74/866; 180/247

[56] References Cited

U.S. PATENT DOCUMENTS

| 4,290,325 | 9/1981 | Nishimura | 74/867 X |
| 4,426,258 | 1/1984 | Kubo et al. | 74/867 |
| 4,570,511 | 2/1986 | Nishimura et al. | 74/867 |
| 4,584,908 | 4/1986 | Nishikawa et al. | 74/866 |

FOREIGN PATENT DOCUMENTS

| 0014174 | 2/1977 | Japan | 74/867 |
| 2015093 | 9/1979 | United Kingdom | 74/867 |

Primary Examiner—Leslie Braun
Assistant Examiner—D. Wright
Attorney, Agent, or Firm—Spencer & Frank

[57] ABSTRACT

A hydraulic controller for transmission includes a brake and a clutch each of which corresponds to a different transmission ratio. An orifice control is provided in the conduit structure of the hydraulic circuit for actuating the clutch and brake such that a working oil quantity is varied in response to the engine throttle valve opening.

5 Claims, 17 Drawing Figures (a)

(b)

(a)

(b)

ENGINE THROTTLE OPENING DEPENDENT HYDRAULIC VEHICULAR TRANSMISSION SYSTEM

DETAILED DESCRIPTION OF THE INVENTION

1. Field of the Invention

The present invention relates to the control of a vehicular transmission whose speed step is set by a hydraulic controller.

2. Description of the Prior Art

When a vehicular transmission comprising a speed step change mechanism, whose speed step change action is set by the action of hydraulic actuators, and a hydraulic controller, which supplies and drains working oil to and from the hydraulic actuators to control the speed step change action of the speed step change mechanism, is set in a speed step by replacing the supply of the working oil to one hydraulic actuator with that of the working oil to the other hydraulic actuator, the quantity of the supplied working oil is simply determined by line oil pressure corresponding to the output power characteristic of an engine, conventionally.

First problem to be solved by the invention

In the above-mentioned prior art, the quantity of the working oil to be supplied to the hydraulic actuator is determined by the characteristic of the line oil pressure, but the revolution speed or output torque of the engine fluctuates depending on the degree of opening of the throttle of the engine. For example, in the auxiliary transmission of a four-wheel-drive transmission which can be set in each selected one of speed steps by replacing the supply of working oil to one hydraulic actuator with that of the working oil to the other hydraulic actuator, a speed step change mechanism is made of a planetary gear unit, the input shaft of the auxiliary transmission and the sun gear of the planetary gear unit are coupled to each other, the output shaft of the auxiliary transmission and the carrier of the planetary gear unit are coupled to each other, a clutch for engaging and disengaging the sun gear and the carrier with and from each other and a brake for fixing and unfixing the ring gear of the planetary gear unit are provided, a high gear step (direct coupling step) is attained by disengaging the brake, a speed reduction step is attained by disengaging the clutch and fixing the brake, and the switchover between the engagement and disengagement or unfixing of the clutch and the brake is performed by using a low/high changeover valve to switch over the working oil for hydraulic servo units for the frictionally engaged elements of the clutch and the brake. When a vehicle equipped with the four-wheel-drive transmission is downshifted, at a constant vehicle speed, from the high gear step (direct coupling step) to the speed reduction step, the revolution speed of the carrier is put at a prescribed level because the carrier is coupled to the output shaft of the four-wheel-drive transmission. At that time, the load on the sun gear is decreased due to the disengagement of the clutch, so that the revolution speed of the sun gear is increased by the output power of the main transmission of the four-wheel-drive transmission and the revolution speed of the ring gear is decreased. As shown in FIG. 10, the synchronization time (which is the time from the disengagement of the clutch to the stoppage of the revolution of the ring gear) $\alpha$ greatly varies depending on the degree of opening of the throttle of the engine, and the engagement time $\beta$ of the brake is determined by the line pressure of the working oil supplied to the brake. When the degree of opening of the engine throttle is high, the engagement of the brake delays behind the synchronization time $\alpha$ so that the low-loaded state of the output shaft of the main transmission continues and the revolution speed of the sun gear therefore rises (the little-loaded acceleration of the engine). When the degree of opening of the engine throttle is low, the engagement of the brake takes place ahead of the synchronization time $\alpha$ so that the revolution speed of the ring gear is forced to be zero before the synchronization and a peak is therefore produced in the fluctuation of the torque at the time of speed step change.

It is the first object of the present invention to provide such a hydraulic controller for a vehicular transmission, which is set in a speed step by replacing the supply of working oil to a hydraulic actuator with that of the working oil to another hydraulic actuator, as to prevent the little-loaded acceleration of an engine and reduce a speed step change shock at the time of the speed step change of the vehicular transmission.

Means for solving the problem

The hydraulic controller for the vehicular transmission, which is provided according to the present invention to solve the above-mentioned problem, includes a flow control valve which functions so that the quantity of working oil to be supplied to a hydraulic actuator is altered depending on the degree of opening of the throttle of the engine, in the vehicular transmission comprising a speed step change mechanism, whose speed step change action is set by the action of the hydraulic actuators, and the hydraulic controller, which supplies and drains the working oil to and from the hydraulic actuators to control the speed step change action of the speed step change mechanism.

Operation, and effect of the invention

Since the hydraulic controller provided for the vehicular transmission according to the present invention and having the above-described construction includes the flow control valve which functions so that the quantity of the working oil to be supplied is altered depending on the degree of opening of the engine throttle, the working oil is drained from one hydraulic actuator and supplied to the other hydraulic actuator to alter the flow rate of the supplied working oil depending on the degree of opening of the engine throttle so as to make the engagement time coincident with the synchronization time.

Description of the prior art

When a vehicular transmission comprising a speed step change mechanism, whose speed step change action is set by the action of hydraulic actuators, and a hydraulic controller, which supplies and drains working oil to and from the hydraulic actuators to control the speed step change action of the speed step change mechanism, is set in a speed step by replacing the supply of the working oil to one hydraulic actuator with that of the working oil to the other hydraulic actuator, a conventional method of altering the pressure of the supplied working oil depending on the speed of the vehicle to reduce a speed step change torque fluctuation (speed step change shock) at the time of speed step change is used.

Second problem to be solved by the invention

In the above-mentioned prior art, the pressure of the working oil to be supplied to the hydraulic actuator is controlled depending on the vehicle speed in order to reduce the speed step change torque fluctuation at the time of speed step change, but the revolution speed or output torque of the engine of the vehicle fluctuates depending on the degree of opening of the throttle of the engine even if the vehicle speed is constant. For example, in the auxiliary transmission of a four-wheel-drive transmission which can be set in each selected one of speed steps, a speed step change mechanism is made of a planetary gear unit, the input shaft of the auxiliary transmission and the sun gear of the planetary gear unit are coupled to each other, the output shaft of the auxiliary transmission and the carrier of the planetary gear unit are coupled to each other, a clutch for engaging and disengaging the sun gear and the carrier with and from each other and a brake for fixing and unfixing the ring gear of the planetary gear unit are provided, a high gear step (direct coupling step) is attained by disengaging the brake, a speed reduction step is attained by disengaging the clutch and fixing the brake, and the switchover between the engagement and disengagement of the clutch and the brake is performed by using a low/high changeover valve to switch over the working oil for hydraulic servo units for the frictionally engaged elements of the clutch and the brake. When a vehicle equipped with the four-wheel-drive transmission is downshifted, at a constant vehicle speed, from the high gear step (direct coupling step) to the speed reduction step, the revolution speed of the carrier is put at a prescribed level because the carrier is coupled to the output shaft of the transmission. At that time, the load on the sun gear decreased due to the disengagement of the clutch, so that the revolution speed of the sun gear is increased by the output power of the main transmission of the four-wheel-drive transmission and the revolution speed of the ring gear is decreased. If the engagement of the brake delays, the low-loaded state of the output shaft of the main transmission continues so that the revolution speed of the sun gear rises (little-loaded acceleration of the engine). If the engagement of the brake is too early, the revolution speed of the ring gear is forced to be zero so that a peak is produced in the fluctuation in the torque at the time of speed step change. In order to eliminate this drawback, the brake needs to be engaged when the revolution speed of the ring gear is forced to be zero. However, since the time (synchronization time) from the start of the disengagement of the clutch to the stoppage of the revolution of the ring gear greatly varies depending on the degree of opening of the throttle of the engine, the little-loaded acceleration of the engine and the production of the peak in the torque cannot be prevented by a simple characteristic of oil pressure application to a hydraulic servo unit for engaging the brake. For example, if setting is performed to prevent the little-loaded acceleration of the engine and the production of the peak in the torque at the medium degree of opening of the engine throttle, the little-loaded acceleration of the engine is caused at the high degree of opening of the engine throttle, the peak in the torque is produced at the low degree of opening of the engine throttle, and the time lag to the end of speed step change is lengthened at the very low degree of opening of the engine throttle.

It is the second object of the present invention to provide such a hydraulic controller for a vehicular transmission, which is set in a speed step by replacing the supply of working oil to a hydraulic actuator with that of the working oil to another hydraulic actuator, as to prevent the little-loaded acceleration of an engine, reduce a speed step change shock, and decrease the time lag at the very low degree of opening of the throttle of the engine, at the time of speed step change of the vehicular transmission.

Means for solving the second problem

The hydraulic controller, which is provided for the vehicular transmission according to the present invention to eliminate the above-mentioned problem, includes a flow control valve which functions so that the flow rate of the working oil to be supplied to the hydraulic actuator is made large at the very low degree of opening of the engine throttle, small at the low and medium degrees of opening of the engine throttle, and large at the high degree of opening of the engine throttle, in the vehicular transmission comprising a speed step change mechanism, whose speed step change action is controlled by the action of the hydraulic actuator, and the hydraulic controller, which supplies and drains the working oil to and from the hydraulic actuator to control the speed step change action of the speed step change mechanism.

Operation, and effect of the invention

Since the hydraulic controller provided for the vehicular transmission according to the present invention and having the above-described construction includes the flow control valve which functions so that the flow rate of the working oil to be supplied to the hydraulic actuator is made large at the very low degree of opening of the engine throttle, small at the low and medium degrees of opening of the engine throttle, and large at the high degree of opening of the engine throttle, both the prevention of little-loaded acceleration of the engine and the reduction of speed step change shock are achieved, and the time lag at the very low degree of opening of the engine throttle is decreased, at the time of the speed step change action of the speed step change mechanism, which sets the vehicular transmission in a speed step by draining the working oil from one hydraulic actuator and supplying the working oil to another hydraulic actuator.

DETAILED DESCRIPTION OF THE PREFERRED EMBODIMENTS

Figure 1:
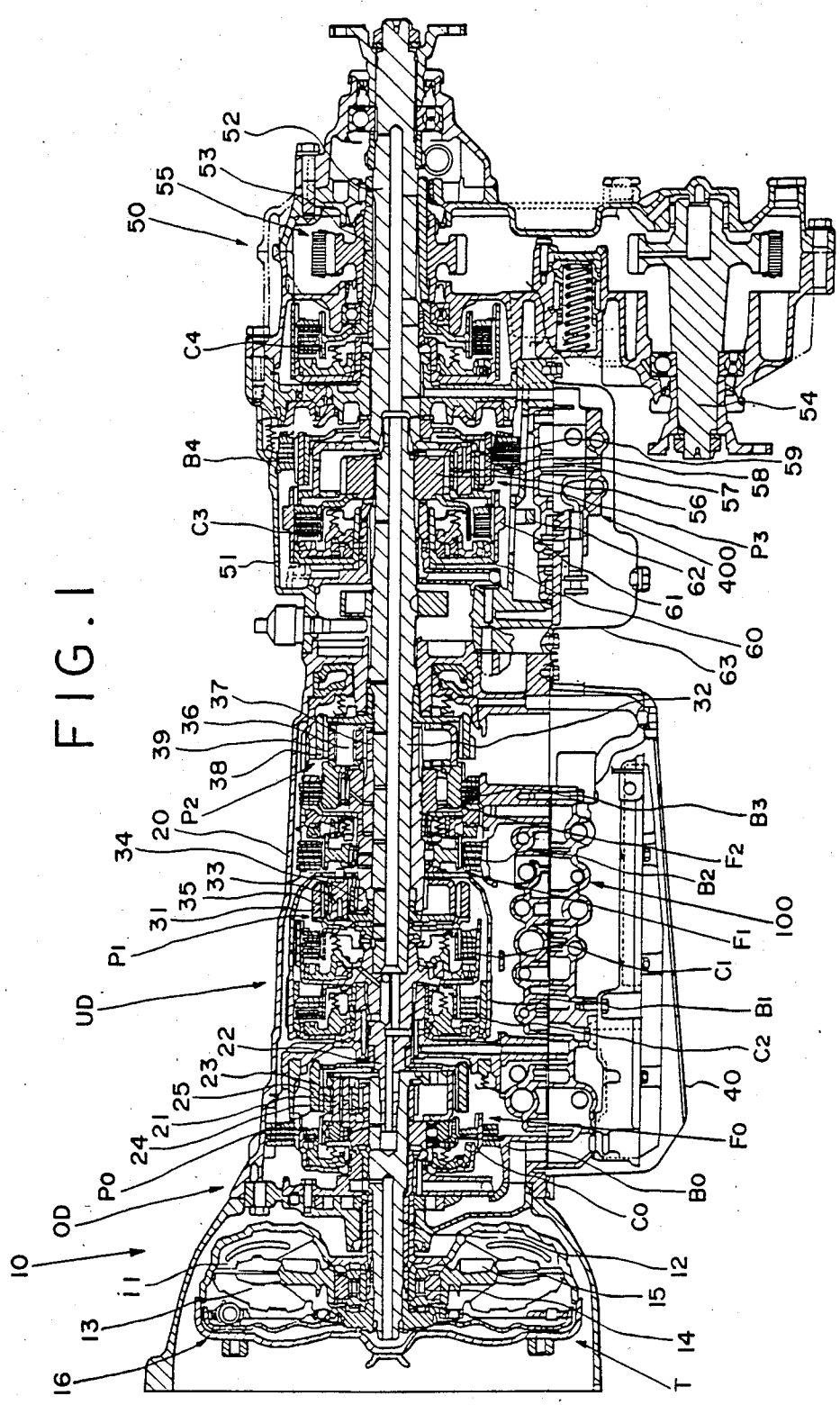
FIG. 1 shows a sectional view of afour-wheel-drive transmission.

An embodiment of the present invention, which is a hydraulic controller for a vehicular transmission, is hereinafter described referring to the drawings.

Figure 2:
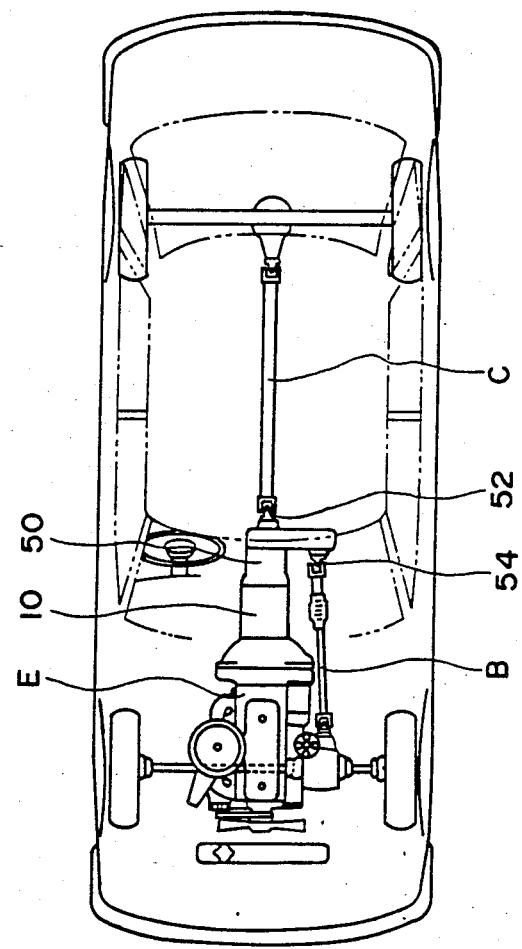
FIG. 2 shows a schematic view of the drive mechanism of a four-wheel-drive vehicle.

FIG. 1 shows sectional views of a four-speed-step automatic transmission for four forward speed steps and one backward speed step, and a four-wheel-drive auxiliary transmission. FIG. 2 shows a schematic view of a four-wheel-drive vehicle.

Shown at 10 is the four-speed-step automatic transmission which includes an overdrive and is a main transmission. Shown at 50 is the four-wheel-drive auxiliary transmission coupled to the rear of the planetary gear speed step change unit of the main transmission 10. The output shaft 32 of the main transmission 10 coupled to an engine E serves as the input shaft of the four-wheel-drive auxiliary transmission 50, whose first output shaft 52 is coupled to a propeller shaft C for driving the rear wheels of the vehicle and whose second output shaft 54 is coupled to a propeller shaft B for driving the front wheels of the vehicle.

The main transmission 10 comprises a fluid torque converter T, an overdrive mechanism OD, and an underdrive mechanism UD for three forward speed steps and one backward speed step.

The torque converter T comprises a pump impeller 11 coupled to the output shaft of the engine E, a turbine impeller 13 coupled to the output shaft 12 of the torque converter T, a stator 15 coupled to a fixed portion through a one-way clutch 14, and a high gear clutch 16. The output shaft 12 of the torque converter T serves as the input shaft of the overdrive mechanism OD.

The overdrive mechanism OD comprises a multi-plate clutch Co, a multi-plate brake Bo and a one-way clutch Fo, which are frictionally engaged units, and a planetary gear unit Po whose component member is fixed to a fixed member such as a main transmission case 20 or coupled to an input shaft, an output shaft or another member or is unfixed or uncoupled therefrom, depending on the selected engagement of the frictionally engaged units.

The planetary gear unit Po comprises a carrier 21 coupled to the output shaft 12, a ring gear 23 coupled to the output shaft 22 of the overdrive mechanism OD, a sun gear 24 which is rotatably fitted on the output shaft 12 and which is fixed to the main transmission case 20 through the brake Bo and coupled to the carrier 21 through the clutch Co and the one-way clutch Fo disposed in parallel with the clutch Co, and a planetary pinion 25 rotatably supported by the carrier 21 and engaged with the sun gear 24 and the ring gear 23.

The output shaft 22 of the overdrive mechanism OD also serves as the input shaft of the underdrive mechanism UD for three forward speed steps and one backward speed step.

The underdrive mechanism UD comprises multi-plate clutches C1 and C2, which are frictionally engaged units, a band brake B1, multi-plate brakes B2 and B3, one-way clutches F1 and F2, a front-stage planetary gear unit P1, and a rear-stage planetary gear unit P2.

The front-stage planetary gear unit P1 comprises a ring gear 31 coupled to the output shaft 22 through the clutch C1, a carrier 33 coupled to the output shaft 32 of the underdrive mechanism UD, a sun gear 34 which is coupled to the output shaft 22 through the clutch C2 and is fixed to the main transmission case 20 through the band brake B1, the brake B2 disposed in parallel with the band brake B1, and the one-way clutch F1 disposed in series with the brake B2, and a planetary pinion 35 rotatably supported by the carrier 33 and engaged with the sun gear 34 and the ring gear 31.

The rear-stage planetary gear unit P2 comprises a carrier 36 which is fixed to the main transmission case 20 through the brake B3 and the one-way clutch F2 disposed in parallel with the brake B3, a sun gear 37 formed integrally with the sun gear 34 of the front-stage planetary gear unit P1, a ring gear 38 coupled to the output shaft 32, and a planetary pinion 39 rotatably supported by the carrier 36 and engaged with the sun gear 37 and the ring gear 38.

A main hydraulic controller 100, which is housed in an oil sump 40 clamped on the bottom of the main transmission case 20 and is provided with an oil strainer 101 under the controller 100, functions to selectively engage or disengage the clutches and the brakes of the main transmission 10 to perform an automatic speed step change action for the four forward speed steps including an overdrive step (O/D) or perform a manual speed step change action for the one backward speed step.

The case 51 of the auxiliary transmission 50 is clamped on the rear of the main transmission case 20 by plural bolts in such a manner that the output shaft 32 of the planetary gear units P1 and P2 serves as the input shaft of the auxiliary transmission 50, for clutches C3 and C4 and a brake B4 which are frictionally engaged units. The auxiliary transmission 50 comprises a first output shaft 52 disposed in series with the output shaft 32, a planetary gear unit P3 disposed between the first output shaft 52 and the output shaft 32, a four-wheel-drive sleeve 53 rotatably fitted on the first output shaft 52, a second output shaft 54 juxtaposed in parallel with the output shaft 32 and oriented in the opposite direction to the first output shaft 52, and a drive mechanism 55 disposed between the sleeve 53 and the second output shaft 54.

The planetary gear unit P3 comprises a sun gear 56 spline-fitted to the end of the output shaft 32, a planetary pinion 47 engaged with the sun gear 56, a ring gear 58 engaged with the planetary pinion 57, and a carrier 59 supporting the planetary pinion 57 rotatably and coupled to the front end of the first output shaft 52 of the auxiliary transmission 50. A parking gear 61 is provided on the peripheral portion of a cylinder 60 coupled to the carrier 59. When the shifting lever (not shown in the drawings) of the main transmission 10 is selectively put into a parking position, a pawl is engaged with the parking gear 61 so as to fix the first output shaft 52.

In the auxiliary transmission 50, the clutches and the brake, which are frictionally engaged units, are selectively engaged or disengaged by an auxiliary hydraulic controller 40 provided in an oil sump 63 under the auxiliary transmission case 51.

Figure 3:
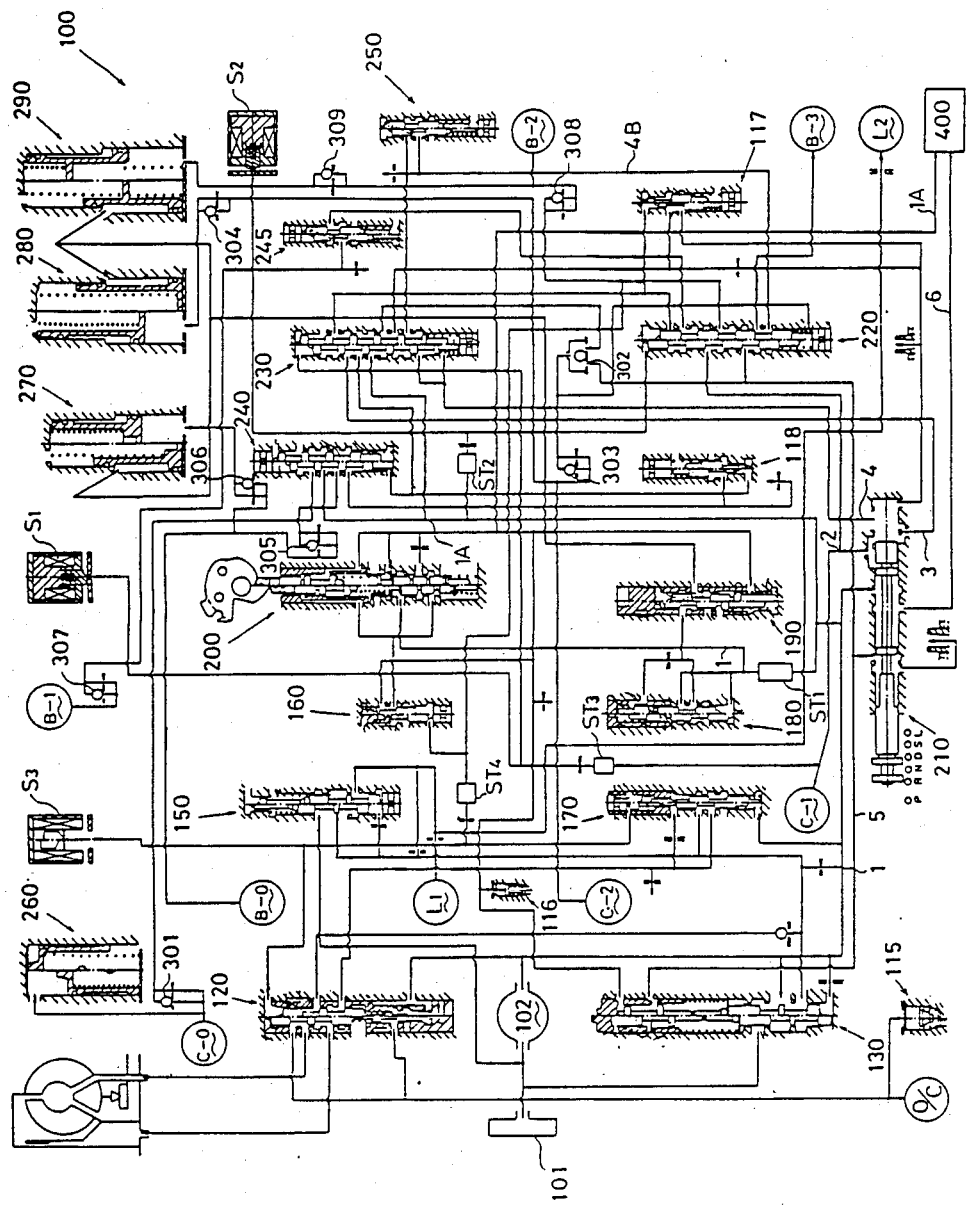
FIG. 3 shows the hydraulic circuit diagram of the hydraulic controller of a main transmission.

FIG. 3 shows the main hydraulic controller 100 of the main transmission 10. The main hydraulic controller 100 comprises the oil strainer 101 housed in the oil sump 40, an oil pump 102, a cooler by-pass valve 115 for controlling the pressure of an oil cooler O/C, a pressure relief valve 116, a release clutch control valve 117, a release brake control valve 118, a lockup relay valve 120, a pressure control valve 130 which regulates the pressure of oil supplied from the oil pump 102, to deliver the oil to an oil passage 1, a second pressure control valve 150 for delivering oil to a lubricating oil feed passage L1 for the main transmission 10 and to a working oil feed passage L2 for the auxiliary transmission 50, a cutback valve 160, a lockup control valve 170, a first accumulator control valve 180, a second accumulator control valve 190, a throttle valve 200 which functions so that oil pressure corresponding to the degree of opening of the throttle of the engine is produced in an oil passage 1A, a manual valve 210 which functions so that line pressure applied to the oil passage 1 is dividedly delivered to oil passages 2, 3, 4, 5 and 6, a 1-2 shift valve 220, a 2-3 shift valve 230, a 3-4 shift valve 240, an intermediate coast modulator valve 245 which controls the pressure of oil to be supplied to the brake B1, a low coast modulator valve 250 which controls the pressure of oil to be supplied to a hydraulic servo unit B-3, an accumulator 260 for smoothing the engagement of the clutch Co, an accumulator 270 for smoothing the engagement of the brake Bo, an accumulator 280 for smoothing the engagement of the clutch C2, an accumulator 290 for smoothing the engagement of the brake B2, hydraulic servo units C-o, C-1 and C-2 for the clutches C-o, C1 and C2, hydraulic servo units B-o, B-1, B-2 and B-3 for the brakes Bo, B1, B2 and B3, flow control valves 301, 303, 304, 305, 306, 307, 308 and 309 which are provided with check valves and regulate the flow rates of pressure oil to be supplied, a shuttle valve 302, oil strainers ST1, ST2, ST3 and ST4, a first solenoid valve S1 which is opened or closed by an output of an electronic controller (computer) (described hereinafter) 600 to regulate the 2-3 shift valve 230, a second solenoid valve S2 which is opened or closed by an output of the electronic controller 600 to regulate both the 1-2 shift valve 220 and the 3-4 shift valve 240, a third solenoid valve S3 which is opened or closed by an output of the electronic controller 600 to regulate both the lockup relay valve 120 and the lockup control valve 170, and oil passages for connecting these valves to each other and the hydraulic cylinders of the clutches and the brakes to each other.

The shifting lever (not shown in the drawings) of the main transmission 10, which is provided at the driver's seat of the vehicle in order to actuate the manual valve 210, has main shift positions (Mp) P (parking), R (reverse), N (neutral), D (drive), S (second) and L (low). TAB. 1 shows the relationship among the main shift positions (Mp), the fourth speed step (4), the third speed step (3), the second speed step (2) and the first speed step (1) of the vehicular transmission, and the action of the clutches and the brakes.

TABLE 1

| Mp | | S1 | S2 | S3 | C1 | C2 | Co | B1 | B2 | B3 | Bo | F1 | F2 | F3 |
|---|---|---|---|---|---|---|---|---|---|---|---|---|---|---|
| P |   | O | X | X | X | X | E | X | X | X | X | f | f | f |
| R |   | O | X | X | X | E | E | X | X | E | X | f | f | f |
| N |   | O | X | X | X | X | E | X | X | X | X | f | f | f |
| D | 1 | O | X | X | E | X | E | X | X | X | X | f | L | (L) |
|   | 2 | O | O | ⊚ | E | X | E | X | E | X | X | L | f | (L) |
|   | 3 | X | O | ⊚ | E | E | E | X | E | X | X | f | f | (L) |
|   | 4 | X | X | ⊚ | E | E | X | X | E | X | E | f | f | f |
| S | 1 | O | X | X | E | X | E | X | X | X | X | f | L | (L) |
|   | 2 | O | O | ⊚ | E | X | E | E | E | X | X | (L) | f | (L) |
|   | 3 | X | O | ⊚ | E | E | E | X | E | X | X | f | f | (L) |
|   | (3) | X | X | X | E | E | E | X | E | X | X | f | f | (L) |
| L | 1 | O | X | X | E | X | E | X | X | E | X | f | (L) | (L) |
|   | 2 | O | O | X | E | X | E | E | E | X | X | (L) | f | (L) |
|   | (1) | X | X | X | E | X | E | X | X | E | X | f | (L) | (L) |

In TAB. 1, O for the solenoid valves S1 and S2 denotes the supply of electricity thereto, X for the solenoid valves S1 and S2 denotes the non-supply of electricity thereto, ⊚ for the solenoid valve S3 denotes the state that lockup is caused by the supply of electricity thereto, X for the solenoid valve S3 denotes the state that lockup is eliminated, E denotes the state that the corresponding clutch and brake are engaged, X for the clutches and the brakes denotes the state that the corresponding clutch and brake are disengaged, L denotes the state that the corresponding one-way clutch is engaged under the driving action of the engine but the engagement is not necessarily needed (locking) because the transmitting of motive power is assured by the clutch or brake disposed in parallel with the one-way clutch, (L) denotes the state that the corresponding one-way clutch is engaged only under the driving action of the engine and is not engaged under the braking action of the engine, and f denotes the state that the corresponding one-way clutch is free.

TAB. 2 shows the connection or disconnection between the oil passage 1 and the oil passages 2, 3, 4, 5 and 6.

TABLE 2

|  | P | R | N | D | S | L |
|---|---|---|---|---|---|---|
| Oil passage 2 | X | X | X | O | O | O |
| Oil passage 3 | X | X | X | X | O | O |
| Oil passage 4 | X | X | X | X | X | O |
| Oil passage 5 | X | O | X | X | X | X |
| Oil passage 6 | X | O | O | O | O | O |

In TAB. 2, O denotes the state that the line pressure is applied through the connection, and X denotes the state that the line pressure is discharged.

Figure 4:
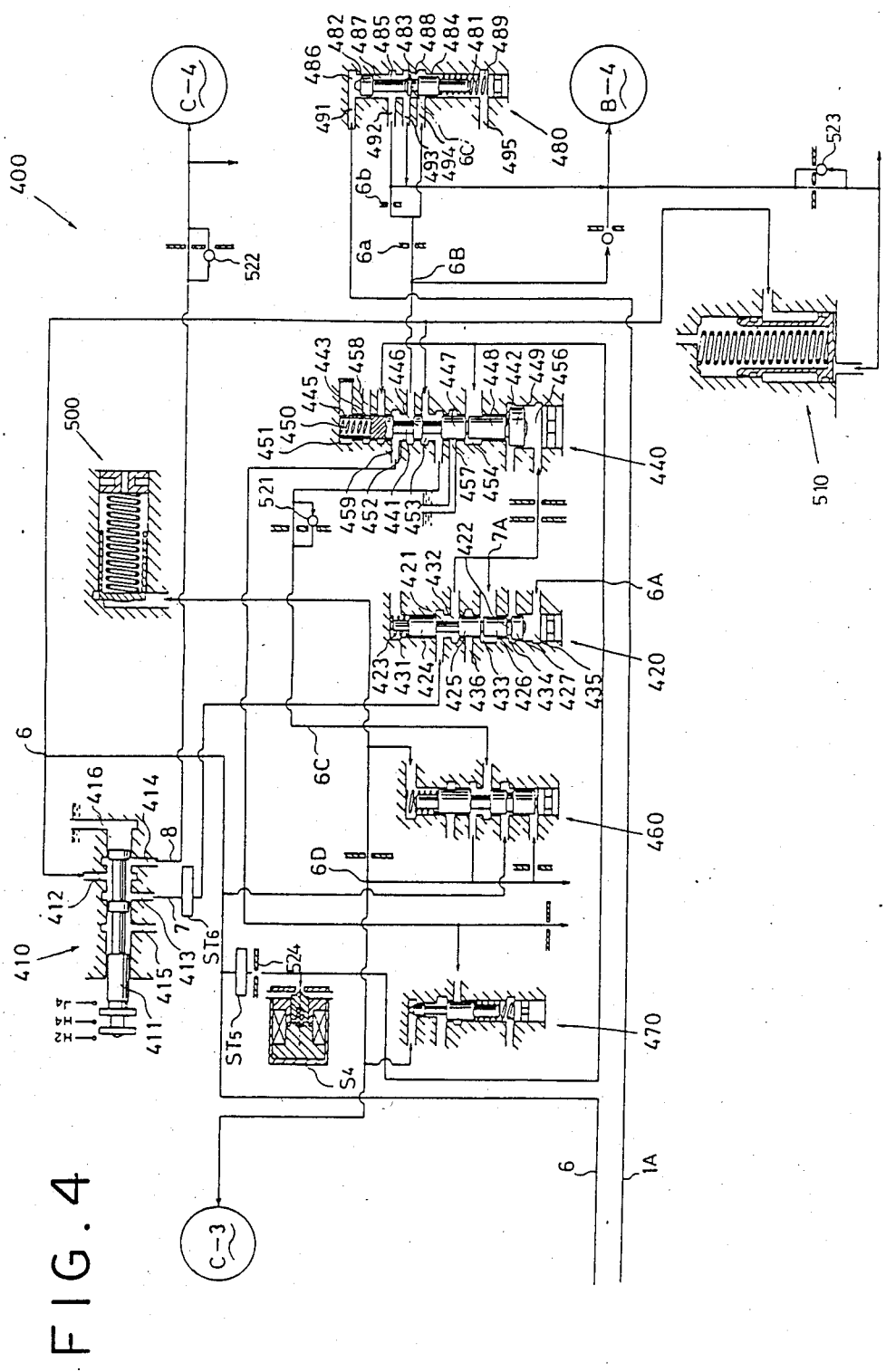
FIG. 4 shows the hydraulic circuit diagram of the hydraulic controller of an auxiliary transmission.

FIG. 4 shows the auxiliary hydraulic controller 400 of the four-wheel-drive auxiliary transmission 50. The hydraulic controller 400 comprises a transfer manual valve 410 which functions so that oil supplied through the oil passage 6 of the main hydraulic controller 100 is delivered to oil passages 7 and 8 through the manual operation of the shifting lever provided at the driver's seat of the vehicle, a relay valve 420, a low/high changeover valve 440 for changing over the engagement of the clutch C3 and that of the brake B4 to each other, a third accumulator control valve 460, a shift timing valve 470, an orifice control valve 480 for controlling the engagement of the brake B4 depending on the degree of opening of the throttle of the engine, an accumulator 500 for smoothing the engagement of the clutch C3, an accumulator 510 for smoothing the engagement of the brake B4, hydraulic servo units C-3, C-4 and B-4 for the clutches C3 and C4 and the brake B4, flow control valves 521, 522 and 523 which are provided with check valves and regulate the flow rates of supplied pressure oil, oil strainers ST5 and ST6, a fourth solenoid valve S4 which is opened or closed by an output of the electronic controller 600 (described hereinafter), and oil passages for connecting these valves to each other and the hydraulic cylinders of these clutches and brakes to each other.

The transfer manual valve 410 comprises a spool 411 coupled to the shifting lever (not shown in the drawings) provided at the driver's seat of the vehicle, an inlet port 412 connected to the oil passage 6 of the main hydraulic controller 100 for the main transmission 10, an outlet port 413 connected to the oil passage 7, an outlet port 414 connected to the oil passage 8, and drain ports 415 and 416. When the spool 411 is set in a two-wheel-drive high gear (direct coupling) (H2) position, the oil passages 6 and 7 are connected to each other and the oil passage 8 is connected to the drain port 416. When the spool 411 is set in a four-wheel-drive high gear (direct coupling) (H4) position, the oil passage 6 is connected to the oil passages 7 and 8. When the spool 411 is set in a four-wheel-drive speed reduction (L4) position, the oil passages 6 and 8 are connected to each other and the oil passage 7 is connected to the drain port 415.

The relay valve 420 comprises a spool 421 and a plunger 422 disposed in series with the spool. The spool 421 has a top (as to the drawing) land 424 and a bottom (as to the drawing) land 425 which have the same diameter. A spring 423 is provided on the rear of the spool 421. The plunger 422 has a top (as to the drawing) land 426 having the same diameter as the lands of the spool 421, and a bottom (as to the drawing) land 427 having a larger diameter than the top land 426. A top (as to the drawing) oil chamber 431, a first intermediate oil chamber 432 between the top land 424 and the bottom land 425, a second intermediate oil chamber 433 between the spool 421 and the plunger 422, a third intermediate oil chamber 434 between the top land 426 and the bottom land 427, and a bottom (as to the drawing) oil chamber 435 are defined by the spool 421 and the plunger 422.

When the spool 421 and the plunger 422 of the relay valve 420 are set in upper (as to the drawing) positions by applying oil pressure to the bottom oil chamber 435 through an oil passage 6A, the oil passage 7 and a line pressure application oil passage 7A are connected to each other through the first intermediate oil chamber 432 so that the line pressure can be applied or discharged to or from the bottom oil chamber 456 of the low/high changeover valve 440 by the switchover of the transfer manual valve 410. When the line pressure is applied to the bottom oil chamber 456 of the low/high changeover valve 440 through the transfer manual valve 410 by connecting the oil passage 7 and the line pressure application oil passage 7A to each other, feedback pressure is applied to the second intermediate oil chamber 433 so that the spool 421 is fixed in an upper (as to the drawing) position. At that time, if oil pressure is discharged from the bottom oil chamber 435 by supplying electricity to the solenoid valve S4 according to an output of the electronic controller 600, the plunger 422 is set in a lower (as to the drawing) position but the spool 421 remains fixed in the upper position so that the line pressure is kept applied to the bottom oil chamber 456 of the low/high changeover valve 440. In that state, if the line pressure in the oil passage 7 is discharged therefrom by the transfer manual valve 410 or if the line pressure is discharged from the bottom oil chamber 435 by supplying electricity to the fourth solenoid valve S4 according to an output of the electronic controller 600 as the oil passage 7 and the line pressure application oil passage 7A are connected to each other and the line pressure is discharged from the bottom oil chamber 456 of the low/high changeover valve 440 by the transfer manual valve 410, the spool 421 and the plunger 422 are set in lower (as to the drawing) positions by the force of the spring 423 so that the line pressure application oil passage 7A is connected to a drain port 436 through the first intermediate oil chamber 432. When the spool 421 is in the lower position, the line pressure is not applied to the bottom oil chamber 456 of the low/high changeover valve 440 by the transfer manual valve 410 but remains discharged from the bottom oil chamber 456 so that the spool 441 and the plunger 442 of the low/high changeover valve 440 are set in lower (as to the drawing) positions.

The low/high changeover valve 440 comprises a low/high changeover spool 411 and an inhibitor valve element 442, as shown in FIG. 4. The low/high changeover spool can be moved between a first set position (lower position as to the drawing) and a second set position (upper position as to the drawing) so as to serve as a changeover valve element to apply and discharge the line pressure oil to and from the hydraulic servo unit C-3 for the clutch C3 and the hydraulic servo unit B-4 for the brake B4. The inhibitor valve element 442 is conjoined in series with the low/high changeover spool 411, and can be moved between a first set position (lower position as to the drawing) and a second set position (upper position as to the drawing). When the inhibitor valve element 442 is put in the second set position, the low/high changeover spool 411 is also put in the second set position. The low/high changeover spool 411 has a top (as to the drawing) sleevelike land 445, a bottom land 447 and an intermediate land 446 which have the same diameter. A spring 450 for urging the spool 411 toward the first set position is provided on the rear of the spool. The inhibitor valve element 442 has a top land 448 having the same diameter as the lands of the low/high changeover spool, and a bottom land 449 having a larger diameter than the top land 448. A top oil chamber 451, a first and a second intermediate oil chambers 452 and 453 between the intermediate land 446 and each of the sleevelike land 445 and the bottom land 447, an oil chamber 454 between the low/high changeover spool 411 and the inhibitor valve element 442 and the bottom oil chamber 456 are defined by the spool 411 and the valve element 442.

When the low/high changeover spool 411 of the low/high changeover valve 440 is set in the lower position, the top oil chamber 451 is connected to the oil passage 6A through the oil port 443 of the sleevelike land 445, the line pressure oil passage 6 and a speed reduction oil passage 6B are connected to each other through the first intermediate oil chamber 452, and a high gear (direct coupling) oil passage 6C and a drain port 457 are connected to each other through the second intermediate oil chamber 453. When the low/high changeover spool 411 is set in the upper position, the top oil chamber 451 is connected to a drain port 458 through the oil port 443 of the sleevelike land 445, the speed reduction oil passage 6B and a drain port 459 are connected to each other through the first intermediate oil chamber 452, and the oil passage 6 and the high gear (direct coupling) oil passage 6C are connected to each other through the second intermediate oil chamber 453. The oil chamber 454 always acts to urge the low/high changeover spool 411 toward the second set position, and is connected to the oil passage 6A in which oil pressure corresponding to the signal of the fourth solenoid valve S4 which functions to urge the inhibitor valve element 442 toward the first set position is produced. The bottom oil chamber 456 always acts to urge the inhibitor valve element 442 toward the second set position.

The orifice control valve 480 is a flow control valve provided according to the present invention, and functions so that the line pressure applied to the oil passage 6B is regulated to a level corresponding to the degree of opening of the throttle of the engine and is then applied to the hydraulic servo unit B-4. The orifice control valve 480 has a spool 485, which is urged upwards (as to the drawing) by a spring 481 and comprises a top land 482, an intermediate land 483 and a bottom land 484. In the valve 480, a top oil chamber 486, an upper oil chamber 487 between the top land 482 and the intermediate land 483, a lower oil chamber 488 between the intermediate land 483 and the bottom land 484, and a bottom oil chamber 489 containing the spring 481 are defined. A first port 491 for receiving oil pressure produced by the throttle valve 200 for producing in the main hydraulic controller 100 the oil pressure corresponding to the degree of opening of the throttle of the engine, a second port 492 which is connected to the oil passage 6B through orifices 6a and 6b, a third port 493 which is connected to the hydraulic servo unit B-4, a fourth port 494 which is connected to the oil passage 6B through the orifice 6a, and an orifice 6c are provided in that order downwards (as to the drawing) in the orifice control valve 480. The orifice 6c for connecting the upper oil chamber 487 and the lower oil chamber 488 to each other is provided in the spool 485.

Figure 5:
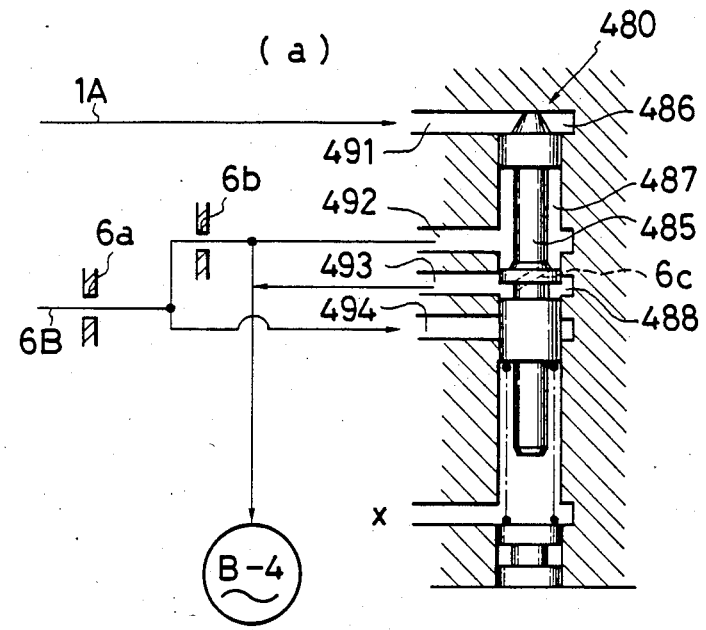
FIG. 5 is an explanatory drawing for the action of an orifice control valve.
Figure 5:
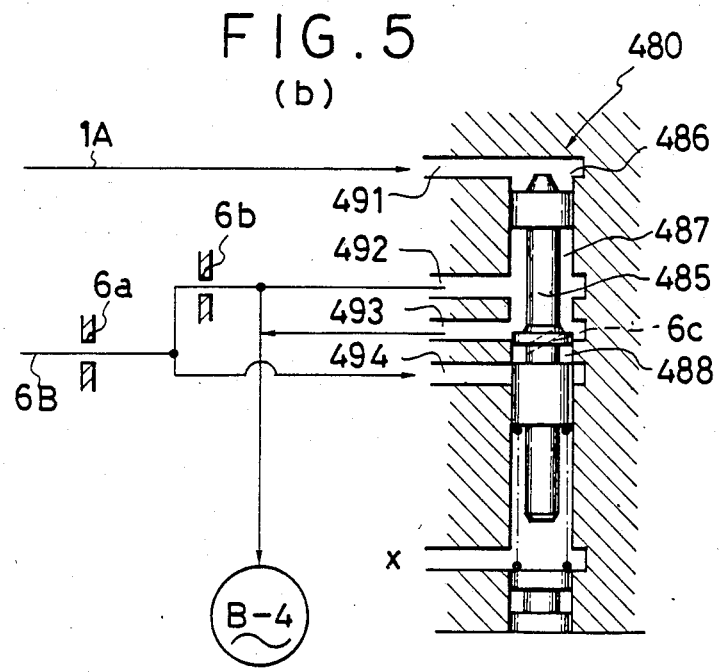
Figure 5:
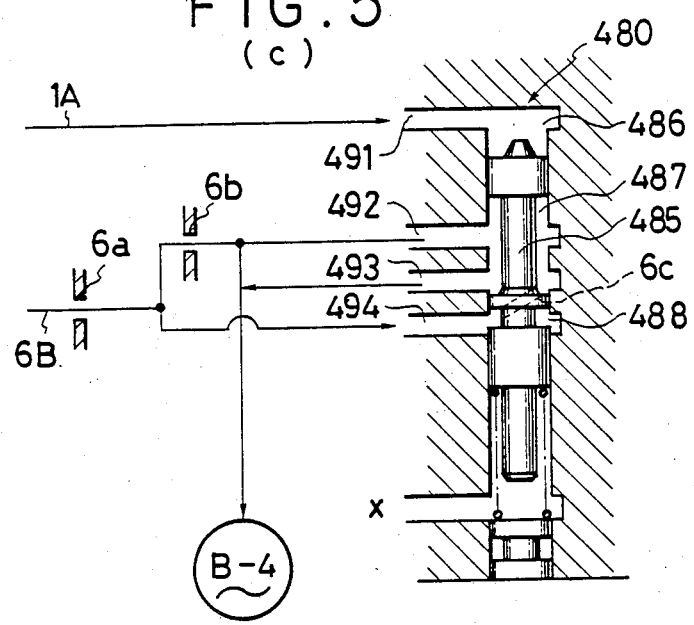
Figure 5:
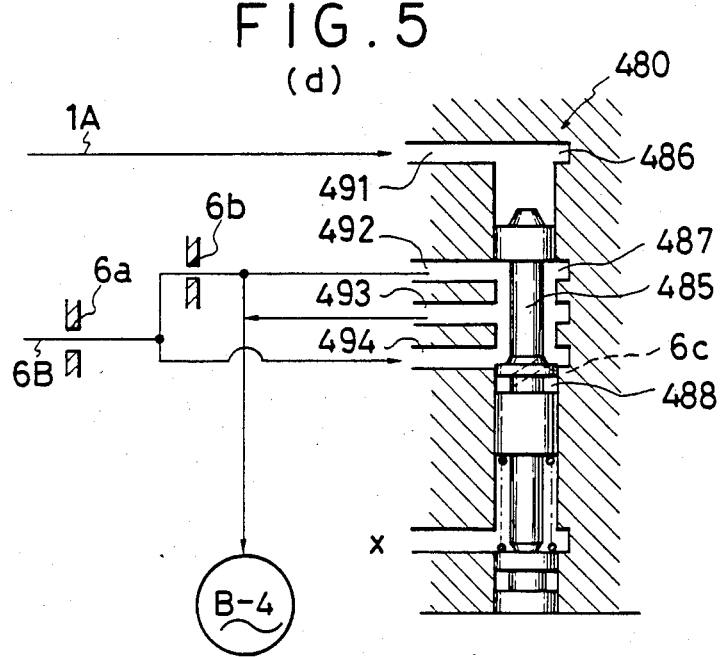
Figure 6:
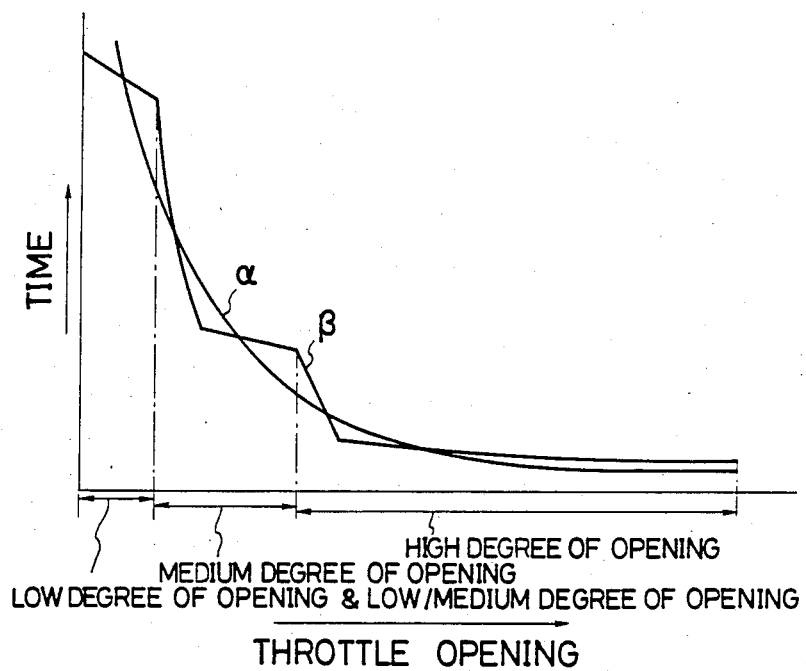
FIG. 6 shows a graph indicating the action of an embodiment of the present invention.
Figure 10:
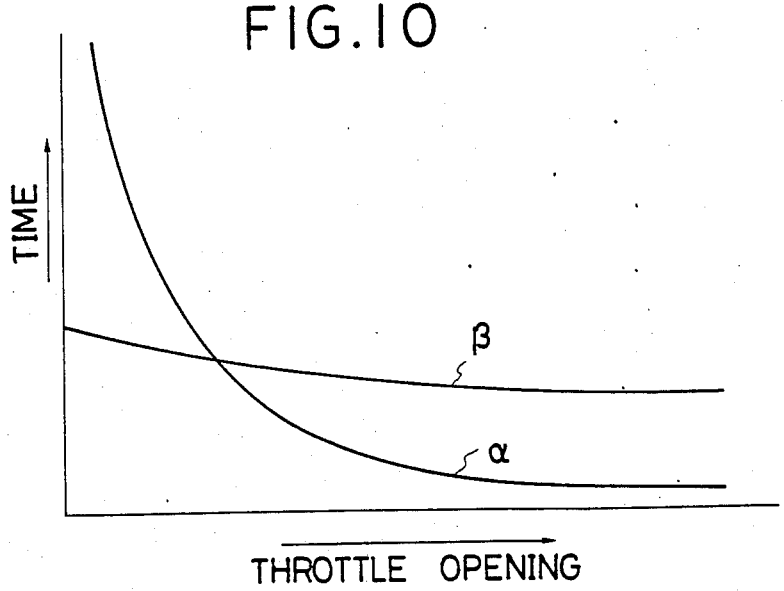
FIG. 10 shows a graph indicating the action of a conventional hydraulic controller.

As shown in FIG. 5, the top oil chamber 486 of the orifice control valve 480 is connected to the oil passage 1A of the throttle valve 200 of the main hydraulic controller 100. When the degree of opening of the throttle of the engine is low (for example, 0%), throttle oil pressure for pushing the spool 485 down (as to the drawing) is not applied to the top oil chamber 486 through the first port 491, so that the spool 485 is set in a position shown at (a) in FIG. 5. At that time, if the line pressure is applied to the oil passage 6B, the hydraulic servo unit B-4 is supplied with working oil from an oil passage extending from the oil passage 6B through the orifices 6a and 6b, and another oil passage extending from the oil passage 6B through the orifices 6a and 6b, the second port 492, the upper oil chamber 487, the orifice 6c, the lower oil chamber 488 and the third port 493. The flow rate of the working oil supplied to the hydraulic servo unit B-4 is determined almost by that through the orifices 6a and 6b. When the degree of opening of the throttle of the engine is low medium (for example, 15%), throttle oil pressure for slightly pushing the spool 485 down (as to the drawing) is applied to the top oil chamber 486 through the first port 491 so that the spool 485 is set in a position shown at (b) in FIG. 5. At that time, if the line pressure is applied to the oil passage 6B, the hydraulic servo unit B-4 is supplied with the working oil from an oil passage extending from the oil passage 6B through the orifices 6a and 6b, and another oil passage extending from the oil passage 6B through the orifices 6a and 6b, the second port 492, the upper oil chamber 497 and the third port 493. The flow rate of the working oil supplied to the hydraulic servo unit B-4 is determined by that through the orifices 6a and 6b. When the degree of opening of the throttle of the engine is medium (for example, 30%), throttle oil pressure for pushing the spool 485 down below the position shown at (b) in FIG. 5 is applied to the top oil chamber 486 through the first port 491 so that the spool 485 is set in a position shown at (c) in FIG. 5. At that time, if the line pressure is applied to the oil passage 6B, the hydraulic servo unit B-4 is supplied with the working oil from an oil passage extending from the oil passage 6B through the orifices 6a and 6b, another oil passage extending from the oil passage 6B through the orifices 6a and 6b, the second port 492, the upper oil chamber 497 and the third port 493, and still another oil passage extending from the oil passage 6B through the orifice 6a, the fourth port 494, the lower oil chamber 488, the orifice 6c, the upper oil chamber 487, the second port 492 and the third port 493. The flow rate of the working oil supplied to the hydraulic servo unit B-4 is determined by that through the orifices 6a and 6b and that through the orifices 6a and 6c. When the degree of opening of the throttle of the engine is high (for example, 100%), throttle oil pressure for pushing the spool 485 to a lower position is applied to the top oil chamber 486 through the first port 491 so that the spool 485 is set in the position shown at (d) in FIG. 5. At that time, if the line pressure is applied to the oil passage 6B, the hydraulic servo unit B-4 is supplied with the working oil from an oil passage extending from the oil passage 6B through the orifices 6a and 6b, another oil passage extending from the oil passage 6B through the orifices 6a and 6b, the second port 492, the upper oil chamber 497 and the third port 493, and still another oil passage extending from the oil passage 6B through the orifice 6a, the fourth port 494, the upper oil chamber 487, the second port 492 and the third port 493. The flow rate of the working oil supplied to the hydraulic servo unit B-4 is determined almost by that through the orifice 6a. The diameters of the orifices 6a, 6b and 6c are set at 3 mm, 1.6 mm and 1.4 mm, respectively, for example, so that the flow rate of the working oil supplied to the hydraulic servo unit B-4 is increased by stages in proportion to the low degree (at (a) in FIG. 5), low medium degree (at (b) in FIG. 5), medium degree (at (c) in FIG. 5), and high degree (at (d) in FIG. 5) of opening of the throttle of the engine. As a result, the time $\beta$ of engagement of the brake B4 is varied by stages as shown in FIG. 6, and is thereby approximated to the synchronization time (which is the time from the disengagement of the clutch C3 to the stoppage of the revolution of the ring gear 58) $\alpha$. In this embodiment, the second port 492 may not be provided. The prevention of little-loaded acceleration of the engine and the reduction of speed step change shock, at the time of the speed step change from the high gear step (direct coupling step) to the speed reduction step, are enabled by the embodiment.

The fourth solenoid valve S4 is regulated by the electronic controller 600 so that the solenoid valve S4 is supplied with electricity as long as the shifting lever (not shown in the drawings) is set in the position L4 (four-wheel-drive speed reduction step) and the moving condition of the vehicle is in a prescribed allowable region, and that the solenoid valve S4 is not supplied with electricity as long as the shifting lever is set in the position H2 (two-wheel-drive high gear (direct coupling) step) or the position H4 (four-wheel-drive high gear (direct coupling) step) and the moving condition of the vehicle is in the prescribed allowable region. When the solenoid valve S4 is not supplied with electricity, high solenoid pressure equal to the line pressure is produced in the oil passage 6A connected to the oil passage 2 through an orifice 524. When the solenoid valve S4 is supplied with electricity, pressure oil is drained from the oil passage 6A and low solenoid pressure is produced.

That shifting lever of the auxiliary transmission 50, which is provided at the driver's seat of the vehicle in order to actuate the transfer manual valve 410, has auxiliary shift positions (Sp) H2 (two-wheel-drive high gear (direct coupling)), L2 (two-wheel-drive speed reduction), H4 (four-wheel-drive high gear (direct coupling)) and L4 (four-wheel-drive speed reduction). TAB. 3 shows the relationship among the auxiliary shift positions Sp, the engagement and disengagement of the brake B4 and the clutches C3 and C4 and the moving condition of the vehicle.

TABLE 3

| Sp | S4 | C3 | B4 | C4 | Moving condition |
|---|---|---|---|---|---|
| H2 | O | X | E | X | L2 |
|    | α | E | X | X | H2 |
| H4 | O | X | E | E | L4 |
|    | α | E | X | E | H4 |
| L4 | X | E | X | E | H4 |
|    | β | X | E | E | L4 |

In TAB. 3, α denotes the state that once the solenoid valve S4 is not supplied with electricity, the high gear (direct coupling) moving condition of the vehicle is maintained even if the solenoid valve S4 is supplied with electricity again; β denotes the state that once the solenoid valve S4 is supplied with electricity, the speed reduction moving condition of the vehicle is maintained even if the supply of electricity to the solenoid valve S4 is stopped; E denotes the state that the corresponding clutch and brake are engaged; and X denotes the state that the corresponding clutch and brake are disengaged.

TAB. 4 shows the connection and disconnection of the oil passage 6 to and from the oil passages 7 and 8 in relation to the shifted positions of the auxiliary transmission.

TABLE 4

|  | H2 | H4 | L4 |
|---|---|---|---|
| Oil passage 7 | O | O | X |
| Oil passage 8 | X | O | O |

In TAB. 4, O denotes the state that the line pressure is applied through the connection; and X denotes the state that the line pressure is discharged.

The operation of the auxiliary transmission 50 in each shifted position is hereinafter described.

(A) When the transfer manual valve 410 is set in the position H2:

As shown in TAB. 4, the line pressure is applied to the oil passage 7, and discharged from the oil passage 8. Since the line pressure is discharged from the oil passage 8, the clutch C4 is disengaged through the discharge of pressure from the hydraulic servo unit C-4 so that motive power is not transmitted to the sleeve 53. As a result, the vehicle is put in a two-wheel-drive state. If the fourth solenoid valve S4 is not supplied with electricity, according to an output of the electronic controller 600, the high solenoid pressure is applied to the bottom oil chamber 435 of the relay valve 420 so that the spool 421 and the plunger 422 are set in upper (as to the drawing) positions, the oil passage 7 and the line pressure application oil passage 7A are connected to each other through the relay valve 420, and a line pressure signal is applied to the bottom oil chamber 456 of the low/high changeover valve 440. As a result, the low/high changeover spool 411 and the inhibitor valve element 442 of the low/high changeover valve 440 are put in the second set positions (upper positions as to the drawing), the oil passage 6B is connected to the drain port 459, pressure is discharged from the oil passage 6B, the hydraulic servo unit B-4 is removed of pressure, and the brake B4 is disengaged. Since the low/high changeover spool 411 and the inhibitor valve element 442 of the low/high changeover valve 440 are put in the second set positions, the oil passage 6C is connected to the oil passage 6 and connected to an oil passage 6D through the third accumulator control valve 460 so that the line pressure is applied to the hydraulic servo unit C-3 to engage the clutch C3. For that reason, the auxiliary transmission 50 is put in the position H2 (two-wheel-drive high gear (direct coupling) state). At that time, since feedback pressure is applied to the second intermediate oil chamber 433 of the relay valve 420 through the line pressure application oil passage 7A, the spool 421 is fixed in the upper position. Even if the low solenoid pressure is applied to the bottom oil chamber 435 by supplying electricity to the fourth solenoid valve S4, only the plunger 422 is set in a lower position and the spool 421 remains set in the upper position, so that the line pressure signal remains applied to the bottom oil chamber 456 of the low/high changeover valve 440. For that reason, the auxiliary transmission 50 is kept in the position H2 (two-wheel-drive high gear (direct coupling) state).

(B) When the transfer manual valve 410 is set in the position H4:

As shown in TAB. 4, the line pressure is applied to both the oil passages 7 and 8. If the fourth solenoid valve S4 is not supplied with electricity, according to an output of the electronic controller 600, the high solenoid pressure is applied to the bottom oil chamber 435 of the relay valve 420 so that the spool 421 and the plunger 422 are set in upper positions, the oil passage 7 and the line pressure supply oil passage 7A are connected to each other, and the line pressure is applied to the bottom oil chamber 456 of the low/high changeover valve 440. As a result, the low/high changeover spool 411 and the inhibitor valve element 442 of the low/high changeover valve 440 are put in the second set positions (upper positions as to the drawing), the oil passage 6B is connected to the drain port 459, pressure is discharged from the oil passage 6B, the hydraulic servo unit B-4 is removed of pressure, the brake B4 is disengaged. Since the low/high changeover spool 411 and the inhibitor valve element 442 of the low/high changeover valve 440 are put in the second set positions, the oil passage 6C is connected to the oil passage 6 and connected to the oil passage 6D through the third accumulator control valve 460 so that the line pressure is applied to the hydraulic servo unit C-3 to engage the clutch C3. The line pressure applied to the oil passage 8 is delivered to the hydraulic servo unit C-4 to engage the clutch C4. For that reason, the auxiliary transmission 50 is put in the position H4 (four-wheel-drive high gear (direct coupling) state). At that time, since feedback pressure is applied to the second intermediate oil chamber 433 of the relay valve 420 through the line pressure application oil passage 7A, the spool 421 is fixed in the upper position. Even if the low solenoid pressure is applied to the bottom oil chamber 435 by supplying electricity to the fourth solenoid valve S4, only the plunger 422 is set in a lower position and the spool 421 remains set in the upper position, so that the line pressure is applied to the bottom oil chamber 456 of the low/high changeover valve 440. For that reason, the auxiliary transmission 50 is kept in the position H4 (four-wheel-drive high gear (direct coupling) state).

(C) When the transfer manual valve 410 is set in the position L4:

As shown in TAB. 4, pressure is discharged from the oil passage 7 and the line pressure is applied to the oil passage 8, so that pressure is discharged from the oil passages 7 and 7A and the line pressure is applied to the oil passage 8, regardless of how the relay valve 420 is set. For that reason, the clutch C4 is engaged and the vehicle is kept in a four-wheel-drive state. If the fourth solenoid valve S4 is not supplied with electricity, according to an output of the electronic controller 600, when the transfer manual valve 410 is put into the position L4 from a high speed position H2 or H4, the high solenoid pressure is applied from the oil passage 6A to the oil chamber 454 of the low/high changeover valve 440 and the line pressure having been applied to the bottom oil chamber 456 is discharged therefrom through the oil passage 7A, the relay valve 420, the oil passage 7 and the transfer manual valve 410 so that the inhibitor valve element 442 of the low/high changeover valve 440 is put in the first set position (lower position as to the drawing) by the line pressure applied to the oil chamber 454 but the low/high changeover spool 411 of the valve 440 remains put in the second set position (upper position as to the drawing). As a result, the transmission is put in the position H4 (four-wheel-drive high gear (direct coupling) state). If the fourth solenoid valve S4 remains supplied with electricity according to an output of the electronic controller 600 when the transfer manual valve 410 is put in the position L4, or if the fourth solenoid valve S4 is supplied with electricity as the transfer manual valve 410 is in the position L4, the low solenoid pressure is applied to the oil passage 6A so that the low/high changeover spool 411 of the low/high changeover valve 440 is put in the first set position (lower position as to the drawing) by the force of the spring 450. For that reason, the oil passages 6 and 6B are connected to each other through the low/high changeover valve 440 so that the line pressure is applied to the hydraulic servo unit B-4 for the brake B4 through the orifice 6a or 6b or the orifice control valve 480, the oil passage 6C is connected to the drain port 457 through the first intermediate oil chamber 452 of the low/high changeover valve 440 and removed of pressure, and the oil pressure of the hydraulic servo unit C-3 for the clutch C3 is discharged. As a result, the auxiliary transmission 50 is put in the position L4 (four-wheel-drive speed reduction state). Once the auxiliary transmission 50 is put in the position L4 (four-wheel-drive speed reduction state), the high solenoid pressure, if it is applied to the oil passage 6A, is delivered to the oil chamber 454 of the low/high changeover valve 440 even though the fourth solenoid valve S4 is not supplied with electricity. Since the high solenoid pressure is applied to the top oil chamber 451 through the oil port 443 of the sleevelike land 445 of the low/high changeover spool 411 at the same time as the delivery of the high solenoid pressure to the oil chamber 454, the low/high changeover spool 411 is not displaced, so that the auxiliary transmission 50 is kept in the position L4 (four-wheel-drive speed reduction state).

(D) When the transfer manual valve 410 is shifted from the position L4 to the position H2 or H4 as the auxiliary transmission 50 is in the four-wheel-drive speed reduction position:

If the fourth solenoid valve S4 is supplied with electricity according to an output of the electronic controller 600, oil pressure is discharged from the bottom oil chamber 435 of the relay valve 420. Since the spool 421 and the plunger 422 are set in lower positions by the force of the spring 423, the top land 424 acts to keep the oil passages 7 and 7A from being connected to each other, so that pressure is discharged from the bottom oil chamber 456 of the low/high changeover valve 440. As a result, the low/high changeover spool 411 and the inhibitor valve element 442 of the low/high changeover valve 440 are set in lower positions by the force of the spring 450, the clutch C3 is disengaged, and the brake B4 is engaged, so that the auxiliary transmission 50 is put in the position L2 (Two-wheel-drive speed reduction state) or L4 (four-wheel-drive speed reduction state). However, since the fourth solenoid valve S4 is not supplied with electricity, according to an output of the electronic controller 600, the high solenoid pressure is applied to the bottom oil chamber 435 of the relay valve 420, so that the spool 421 and the inhibitor valve element 422 are set in upper positions, the oil passages 7 and 7A are connected to each other, the line pressure is applied to the bottom oil chamber 456 of the low/high changeover valve 440, and the low/high changeover spool 411 and the inhibitor valve element 442 are put in the second set positions (upper positions as to the drawings). As a reresult, the oil passage 6B is connected to the drain port 459 and removed of pressure, so that the brake B4 is disengaged. Because the low/high changeover spool 411 and the inhibitor valve element 442 of the low/high changeover valve 440 are put in the second set positions (upper positions as to the drawing) as described above, the oil passage 6C is connected to the oil chamber 6 and connected to the oil passage 6D through the third accumulator control valve 460 so that the clutch C3 is engaged. As a result, the auxiliary transmission 50 is put in the position H2 (two-wheel-drive high gear (direct coupling)) or H4 (four-wheel-drive high gear (direct coupling)).

Figure 7:
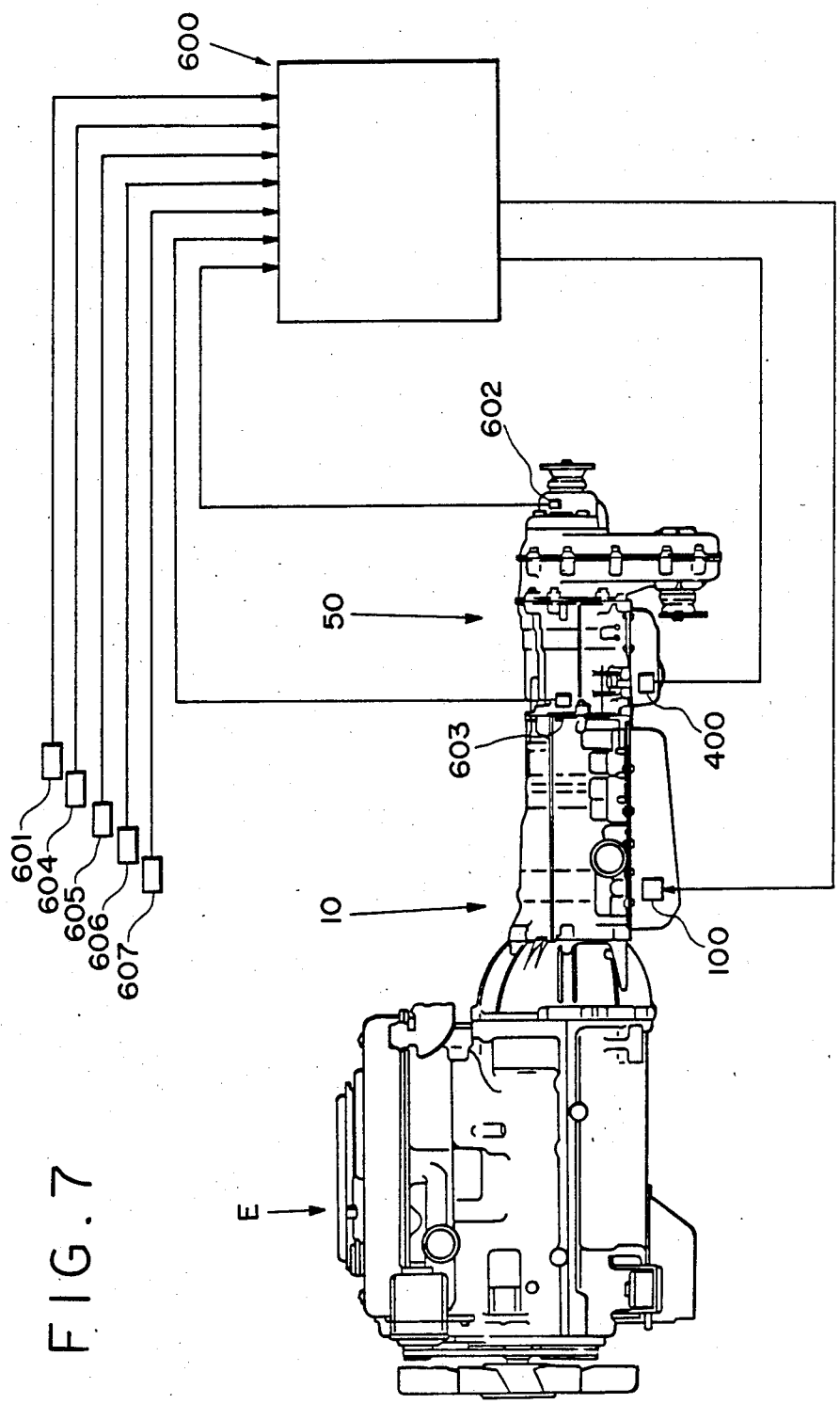
FIGS. 7 and 8 show the block diagrams of an electronic controller.
Figure 8:
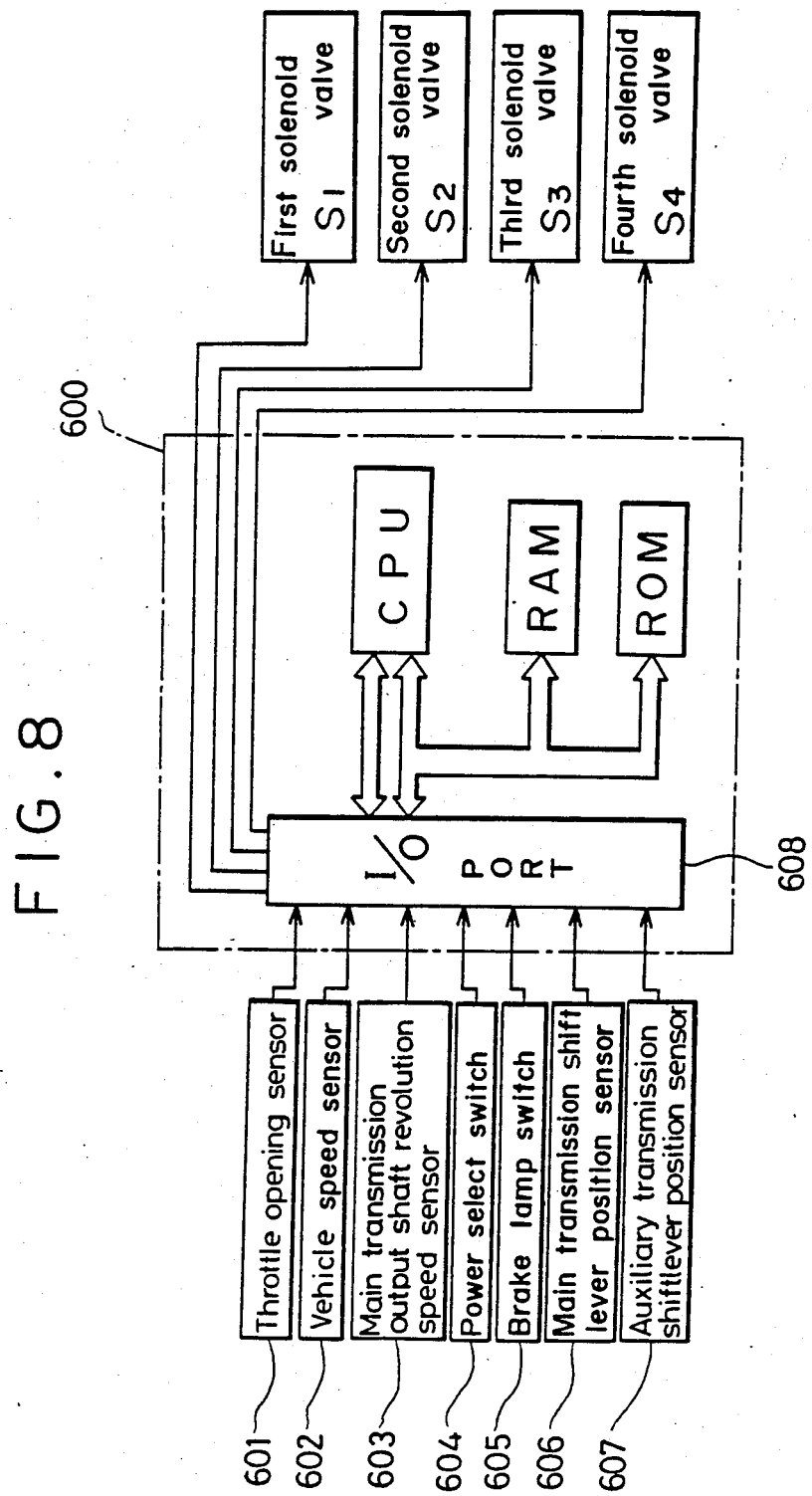

The electronic controller 600 for regulating the speed step change operation of the four-wheel-drive automatic transmission is hereinafter described referring to block diagrams shown in FIGS. 7 and 8. The electronic controller 600, which controls the supply of electricity to the solenoid valves S1, S2, S3 and S4 of the main hydraulic controller 100 and the auxiliary hydraulic controller 400, comprises a throttle opening degree sensor 601 which detects the operated quantity of the accelerator of the vehicle, a vehicle speed sensor 602 which converts into the speed of the vehicle a signal detected from the revolution speed of the output shaft of the auxiliary transmission 50, a main transmission output shaft revolution speed sensor 603 which detects the revolution speed off the output shaft 32 of the main transmission 10 which is also the input shaft of the auxiliary transmission 50, a power selector switch 604 for variably setting a speed step change pattern for an economic condition, a normal condition, a powerful condition or the like according to the choice of the person driving the vehicle, a brake light switch 605, a main transmission shifting lever position sensor 606 which detects the set position (Mp) of the main transmission 10, an auxiliary transmission shifting lever position sensor 607 which detects the set position (Sp) of the auxiliary transmission 50, an I/O port 608 which serves to receive inputs from these vehicle moving condition sensors and send outputs to the solenoid valves S1, S2, S3 and S4, a central processing unit CPU, a random-access memory RAM for performing speed step change point processing, and a read-only memory ROM in which data on speed step change patterns including speed step change points and lockup points are stored.

Figure 9:
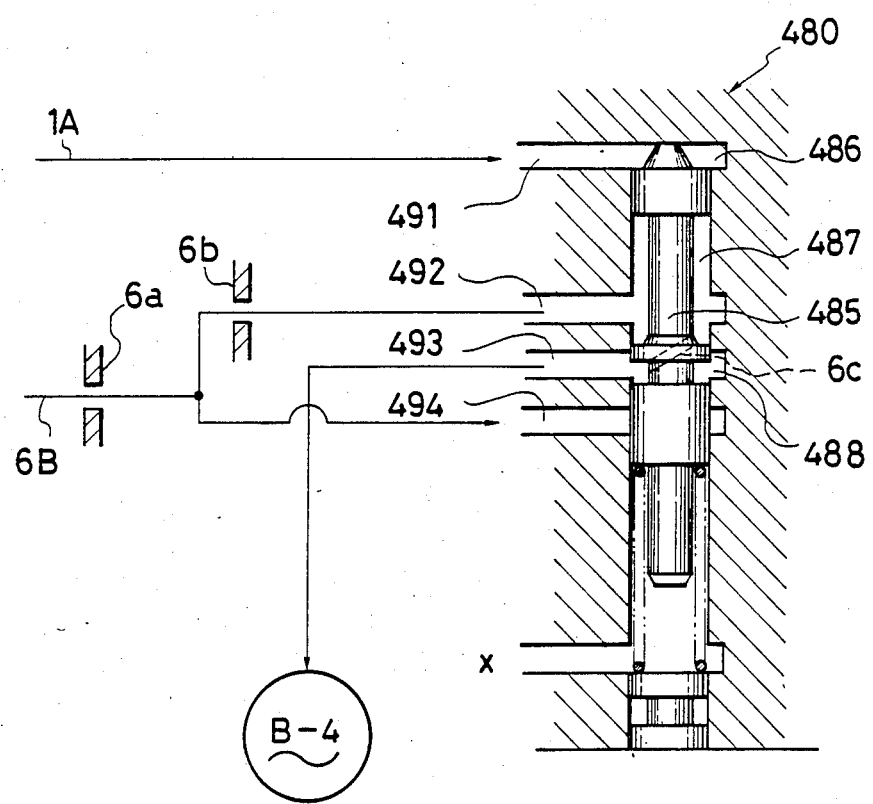
FIG. 9 shows a sectional view of an orifice control valve which is another embodiment of the present invention.

FIG. 9 shows another embodiment of the present invention. This embodiment does not have the oil passage for connecting the second port 492 and third port 493 of the orifice control valve 480 to each other, so that though the flow rate of the working oil supplied to the hydraulic servo unit B-4 through the oil passage 6B at the low degree of opening of the throttle of the engine is determined almost by the flow rate through the orifices 6a and 6b and is nearly equal to that at the low medium degree of opening of the throttle of the engine as to the preceding embodiment, the flow rate of the working oil supplied to the servo unit B-4 through the passage 6B at the low degree of opening of the throttle of the engine is determined by the flow rate through the orifices 6a, 6b and 6c as to the present embodiment, and the flow rates at the low medium degree, the medium degree and the high degree of opening of the throttle of the engine as to the present embodiment are determined in the same manner as the preceding embodiment. For that reason, as for the present embodiment, the flow rate of the working oil supplied to the hydraulic servo unit B-4 is increased by four stages in proportion to the low degree, the low medium degree, the medium degree and the high degree of the throttle of the engine so that the flow rate is controlled more finely.

Figure 11:
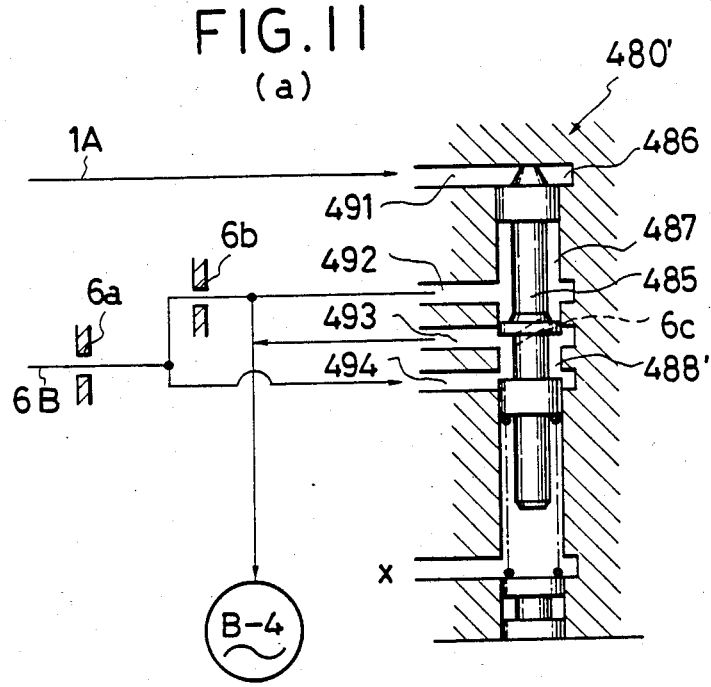
FIG. 11 is an explanatory drawing which corresponds to FIG. 5 and shows still another embodiment of the present invention, which corresponds to claim 3.
Figure 11:
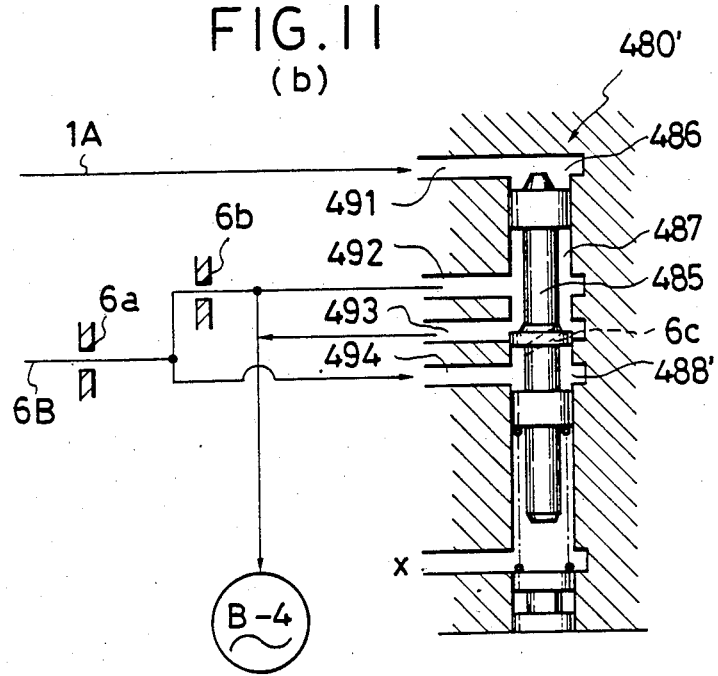
Figure 11:
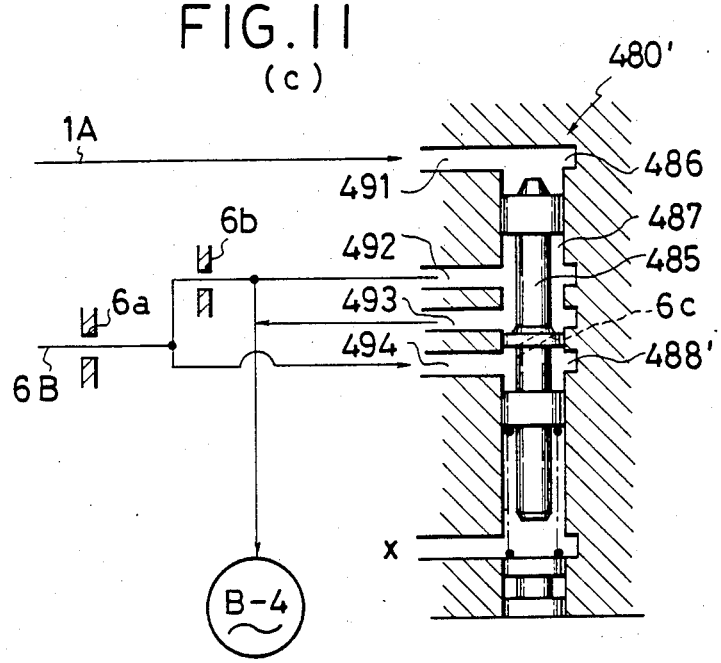
Figure 11:
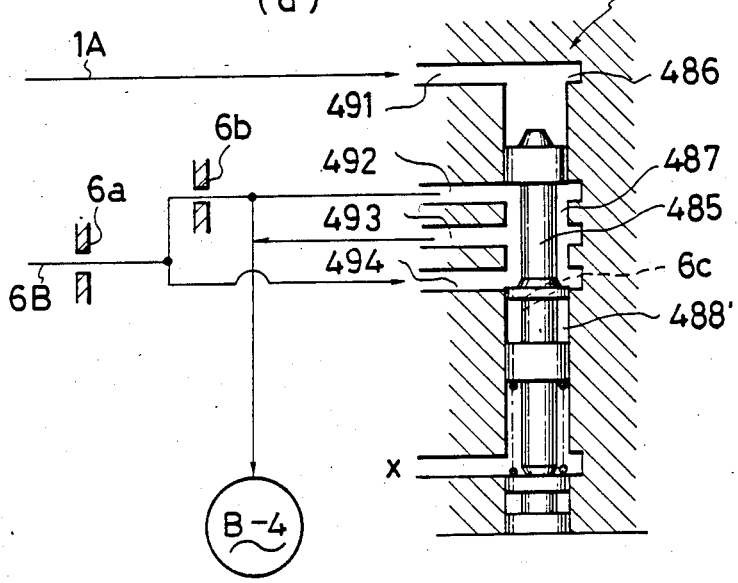

FIG. 11 shows still another embodiment of the present invention, which corresponds to claim 3. In this embodiment, an orifice control valve 480' is adopted instead of the orifice control valve 480 shown in FIG. 4, and functions so that the line pressure applied to the oil passage 6B is regulated to a level corresponding to the degree of opening of the throttle of the engine and is then delivered to the hydraulic servo unit B-4. The orifice control valve 480' has a spool 485, which is urged upwards (as to the drawing) by a spring 481 and comprises a top land 482, an intermediate land 483 and a bottom land 484. A top oil chamber 486, an upper oil chamber 487 between the top land 482 and the intermediate land 483, a lower oil chamber 488' between the intermediate land 483 and the bottom land 484, and a bottom oil chamber 489 containing the spring 481 are defined. The orifice control valve 480' also has a first port 491 which receives oil pressure produced by the throttle valve 200 which produces in the main hydraulic controller 100 the oil pressure corresponding to the degree of opening of the throttle of the engine, a second port 492 which is connected to the oil passage 6B through the orifices 6a and 6b, a third port 493 which is connected to the hydraulic servo unit B-4, a fourth port 494 which is connected to the oil passage 6B through the orifice 6a, and a drain port 495. The spool 485 has an orifice 6c for connecting the upper oil chamber 487 and the lower oil chamber 488' to each other. The diameters of the orifices 6a, 6b and 6c are made different from each other as 6a > 6b > 6c.

As shown in FIG. 11, the top oil chamber 486 of the orifice control valve 480' is connected to the oil passage 1A for the throttle valve 200 of the main hydraulic controller 100. When the degree of opening of the throttle of the engine is very low (for example, 0%), throttle oil pressure for moving the spool 485 down (as to the drawing) is not applied to the top oil chamber 486 through the first port 491, so that the spool 485 is set in a position shown at (a) in FIG. 11. At that time, if the line pressure is applied to the oil passage 6B, the hydraulic servo unit B-4 is supplied with the working oil through an oil passage extending from the oil passage 6B through the orifices 6a and 6b, another oil passage extending from the oil passage 6B through the orifices 6a and 6b, the second port 492, the upper oil chamber 487, the orifice 6c, the lower oil chamber 488 and the third port 493, and still another oil passage extending from the oil passage 6B through the orifice 6a, the fourth port 494, the lower oil chamber 488' and the third port 493. The flow rate of the working oil supplied to the hydraulic servo unit B-4 is determined almost by that through the orifice 6a. When the degree of opening of the throttle of the engine is low (for example 15%), throttle oil pressure for slightly pushing the spool 485 down is applied to the top oil chamber 486 through the first port 491 so that the spool 485 is set in a position shown at (b) in FIG. 11. At that time, if the line pressure is applied to the oil passage 6B, the hydraulic servo unit B-4 is supplied with the working oil through an oil passage extending from the oil passage 6B through the orifices 6a and 6b, another oil passage extending from the oil passage 6B through the orifices 6a and 6b, the second port 492, the upper oil chamber 487 and the third port 493, and still another oil passage extending from the oil passage 6B through the orifice 6a, the fourth port 494, the lower oil chamber 488', the orifice 6c, the upper oil chamber 487, the second port 492 and the third port 493. The flow rate of the working oil supplied to the hydraulic servo unit B-4 is determined by that through the orifices 6a and 6b and that through the orifices 6a and 6c. When the degree of opening of the throttle of the engine is medium (for example, 30%), throttle oil pressure for pushing the spool 485 down below the position shown at (b) in FIG. 11 is applied to the top oil chamber 486 through the first port 491 so that the spool 485 is set in a position shown at (c) in FIG. 11. At that time, if the line pressure is applied to the oil passage 6B, the hydraulic servo unit B-4 is supplied with the working oil through an oil passage extending from the oil passage 6B through the orifices 6a and 6b, and another oil passage extending from the oil passage 6B through the orifice 6a, the fourth port 494, the lower oil chamber 488', the orifice 6c, the upper oil chamber 487, the second port 492 and the third port 493. The flow rate of the working oil supplied to the hydraulic servo unit B-4 is determined by that through the orifices 6a and 6b and that through the orifices 6a and 6c, alike to the case shown at (b) in FIG. 11. When the degree of opening of the throttle of the engine is high (for example, 100%), throttle oil pressure for pushing the spool 485 down is applied to the top oil chamber 486 through the first port 491 so that the spool 485 is set in a position shown at (d) in FIG. 11. At that time, if the line pressure is applied to the oil passage 6B, the hydraulic servo unit B-4 is supplied with the working oil through an oil passage extending from the oil passage 6B through the orifices 6a and 6b, and another oil passage extending from the oil passage 6B through the orifice 6a, the fourth port 494, the upper oil chamber 487, the second port 492 and the third port 493. The flow rate of the working oil supplied to the hydraulic servo unit B-4 is determined almost by that through the orifice 6a. The diameters of the orifices 6a, 6b and 6c are set at 3 mm, 1.6 mm and 1.4 mm, respectively, for example, so that the flow rate of the working oil supplied to the hydraulic servo unit B-4 is made large at the very low degree (the case of (a) in FIG. 11) and high degree (the case of (d) in FIG. 11) of opening of the throttle of the engine, and is made small at the low medium degree (the case of (b) in FIG. 11) and medium degree (the case of (c) in FIG. 11) of opening of the throttle of the engine. As a result, the time lag to the end of speed step change from the high gear (direct coupling) step to the speed reduction step at the very low degree of opening of the throttle of the engine is eliminated, and the prevention of little-loaded acceleration of the engine and the reduction of speed step change shock at the low medium degree and high degree of opening of the throttle of the engine are achieved.

We claim:

1. A hydraulic controller for a vehicular transmission associated with a vehicle engine including means for varying a throttle opening thereof; said hydraulic controller comprising
    two friction engaging devices;
    a shift changing means for engaging one friction engaging device and disengaging the other friction engaging device for changing a speed step;
    an orifice control means connected between said shift changing means and said one friction engaging device; said orifice control means having a plurality of orifices;
    an actuator connected between said one friction engaging device and said orifice control means; and
    means for varying the quantity of working oil supplied to said hydraulic actuator through at least some of said plurality of orifices as a function of the degree of said throttle opening.

2. A hydraulic controller as defined in claim 1, wherein said means for varying the quantity of working oil comprises means for increasing the quantity of working oil supplied to said hydraulic actuator in proportion to an increase of said throttle opening.

3. A hydraulic controller as defined in claim 1, wherein said orifice control means has an orifice control valve including a first of said plurality of orifices; further wherein a second and a third of said plurality of orifices are arranged between the shift changing means and the orifice control valve; further comprising means for supplying working oil through said orifice control valve to said one friction engaging device selectively either through said second and third orifices or through one of said second and third orifices and said first orifice or through one of said second and third orifices and said orifice control valve as a function of the degree of said throttle opening.

4. A hydraulic controller for a vehicular transmission associated with a vehicle engine including means for varying a throttle opening thereof; said hydraulic controller comprising
    two friction engaging devices;
    a shift changing means for engaging one friction engaging device and disengaging the other friction engaging device for changing a speed step;
    an orifice control means connected between said shift changing means and said one friction engaging device; said orifice control means having a plurality of orifices;
    an actuator connected between said one friction engaging device and said orifice control means; and
    means for varying the flow rate of working oil supplied to said hydraulic actuator through at least some of said plurality of orifices as a function of the degree of said throttle opening such that for a very low degree of said throttle opening the flow rate is large, for a low and medium degree of said throttle opening the flow rate is small and for a large degree of throttle opening the flow rate is large.

5. A hydraulic controller as defined in claim 4, wherein said orifice control means has an orifice control valve including a first of said plurality of orifices; further wherein a second and a third of said plurality of orifices are arranged between the shift changing means and the orifice control valve; further comprising means for supplying working oil through said orifice control valve to said one friction engaging device selectively either through said second and third orifices or through one of said second and third orifices and said first orifice or through one of said second and third orifices and said orifice control valve as a function of the degree of said throttle opening.

* * * * *